Inventors
Harold T. Snyder
Eugene E. Plumb
By: Olson, Trexler, Wolters & Bushnell
Attys.

United States Patent Office 3,547,765
Patented Dec. 15, 1970

3,547,765
MULTIPLE-LAYER FABRIC FOR PROTECTIVE GARMENTS AND THE LIKE
Harold I. Snyder, R.R. 3, Dover, Ohio 44622, and Eugene E. Plumb, 10721 Marine View Drive SW., Seattle, Wash. 98146
Filed Aug. 10, 1966, Ser. No. 571,467
Int. Cl. A62d 5/00; B32b 27/08
U.S. Cl. 161—189                    8 Claims

ABSTRACT OF THE DISCLOSURE

A flexible, impermeable coated fabric, which is useful for making protective garments, comprises a polytetrafluoroethylene fabric coated on at least one side with a cured elastomeric copolymer of about 30% to about 70% by weight vinylidene fluoride and about 70% to about 30% by weight hexafluoropropene. A film of surface-defluorinated cementable fluoroethylenepropylene is adhesively bonded to the coated side of the fabric to form a working face.

---

Figure 1:
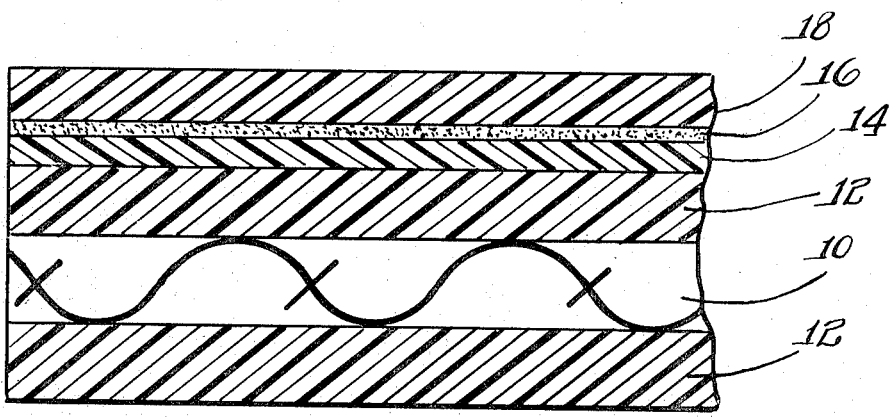

This invention relates generally to flexible coated fabrics and more particularly to such a fabric that is impermeable to highly corrosive chemicals as well as resistant thereto.

In one specific aspect, the present invention relates to flexible coated fabrics that are useful in making protective garments for chemical and aerospace workers or the like.

As more highly corrosive chemicals have been adopted for fueling aerial missiles and launch vehicles, both handling problems and hazards to those persons working directly with such materials have been greatly increased. Garments affording adequate protection in particular have become of critical importance, especially since many sheet products of established chemical resistance are susceptible to invasion either because of pinholes unavoidably produced in manufacture or because of stress cracks developed in use of a fabricated garment. Other prior art sheet products are desirably flexible and intact but insufficiently resistant to such chemicals as nitrogen tetroxide, hydrazine and liquid fluorine.

Therefore, an important object of the present invention is to provide a sheet material product that combines the desirable properties of impermeability, flexibility and chemical inertness in an unusually high degree.

Another object is to provide a flexible coated fabric that is especially useful in the making of protective garments.

These and other objects and features of the invention will become more apparent from a consideration of the following descriptions.

The objects of the present invention are achieved by applying a chemically resistant, elastomeric copolymer onto at least one side of a fabric made from filaments of polytetrafluoroethylene and thereafter bonding a thin film of fluoroethylenepropylene copolymer onto a coated side of the fabric in order to form a working face of the resultant sheet. The elastomeric coating for use in the invention is a copolymer of vinylidene fluoride and hexafluoropropene.

Figure 2:
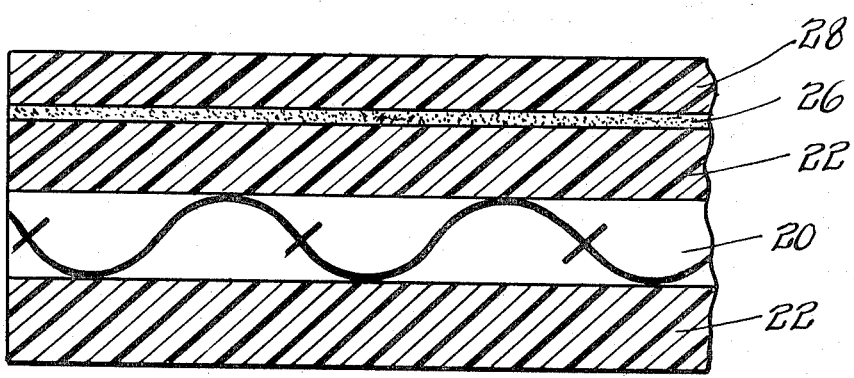

In the drawing:

FIG. 1 is a cross-sectional view of a coated fabric produced in compliance with the invention; and
FIG. 2 is a cross-sectional view of a modified coated fabric made in compliance with the invention.

Considering FIG. 1 in detail, the reference numeral 10 indicates a woven polytetrafluoroethylene fabric, and the reference numeral 12 indicates surface layers of the elastomeric copolymer which have been applied to the fabric 10 as a solution base coat and which have then been thereafter cured. A medial layer 14 comprises a calendered top coat of the elastomeric copolymer which has been applied in an uncured state to one of the base coats 12 and then cured in conjunction with the curing of the layers 12. A very thin layer 16 of the same copolymer bonds a fused fluoroethylenepropylene film 18 to the surface of medial layer 14.

In the modified fabric of FIG. 2, no calendered film of the copolymer is employed, the finished product therefore comprising a polytetrafluoroethylene woven fabric 20, solution coats 22 of the elastomeric copolymer, a bonding layer 26 and a surface film 28 of fluoroethylenepropylene.

The polytetrafluoroethylene fabric employed in the invention is desirably a woven fabric in order that the finished product and any protective garments made therefrom will have maximum strength; and in order to establish other desired properties in the finished product, this fabric, is selected to have a weight of from about 8 to about 15 ounces per square yard.

The elastomeric copolymers that are useful in carrying out the invention are those described in United States Letters Pat. No. 3,025,185. Such materials are copolymerized from about 60 to about 15 parts by weight of vinylidene fluoride with from about 40 to about 85 parts by weight of hexafluoropropene, the reaction being caused to take place at temperatures of from about 85° to about 100° C. under autogenous pressure and preferably in the presence of a polymerization initiator. The resulting elastomeric composition is a copolymer containing from about 70% to about 30% by weight of vinylidene fluoride units and from about 30% to about 70% by weight of hexafluoropropene units. Advantageously, this copolymer is applied to the polytetrafluoroethylene fabric of the present invention at a rate to produce a dry coating having a weight of from about 8.5 to about 21 ounces per square yard. In the uncured state the elastomeric copolymer exhibits solubility in ketones and in both aromatic and aliphatic hydrocarbons. Curing of the copolymer to an insoluble state is accomplished by subjecting it to a temperature of at least about 350° F. for a suitable period of time and preferably in the presence of a curing agent such as benzoyl peroxide or hexamethylene diamine carbamate.

The fluoroethylenepropylene film which is bonded to a coated side of the polytetrafluoroethylene fabric has a thickness of about 2 to about 10 mils; and this film is intended to serve as the working surface of the finished product, being therefore placed on the outside of any fabricated garment. This film, when so placed, serves as the primary chemical barrier whereas the underlying, cured elastomeric copolymer serves as a secondary chemical barrier in the event of pinholing or other discontinuities in the surface film.

Bonding attachment of the fluoroethylenepropylene film is conveniently achieved by means of a layer of the described elastomeric copolymer of vinylidene fluoride and hexafluoropropylene. More specifically, a fused film of fluoroethylenepropylene is surface-defluorinated in accordance with conventional procedures; and thereafter, a thin layer of the uncured elastomeric copolymer composition is applied to the defluorinated surface of fluoroethylenepropylene film. The resulting cementable film is laminated to the coated polytetrafluoroethylene fabric while the coating of such fabric is as yet uncured, the coated surface of the fluoroethylenepropylene film being disposed in contact with a coated surface of the fabric. Finally, the laminate is cured so that the various layers of the elastomeric copolymer bond together forming a continuous matrix interconnecting the polytetrafluoroethylene fabric and the fluoroethylenepropylene film.

In order to describe the invention more fully, the following specific examples are given without, however, intending to limit the invention to the precise details and conditions set forth except as such appear as limitations in the appended claims.

EXAMPLE I

A woven polytetrafluoroethylene fabric having a thread count of 28 threads per inch in both the direction of the warp and the filler strands and comprising yarn of 1,000 denier fibers was selected as a starting material. The selected fabric had a weight of 12 ounces per lineal yard of 30-inch wide material. To this fabric was applied a coating which the following mill mixed dry materials were dissolved in methyl ethyl ketone to form a 40% solution:

| | Parts by weight |
|---|---|
| Elastomeric reaction product of 50 parts (by weight) of vinylidene fluoride and 50 parts (by weight) of hexafluoropropene | 100.0 |
| Zinc oxide (curing activator) | 10.0 |
| Dibasic lead phosphite (curing activator) | 10.0 |
| Hydrated silica (filler) | 20.0 |
| Benzoyl peroxide (curing agent) | 3.0 |
| | 143.0 |

The resultant solution base coat material was applied in successive layers approximately one mil thick using a paste coater machine. Forced drying of each layer was achieved with heated air, and the polytetrafluoroethylene fabric was successively passed through the paste coater a sufficient number of times to apply a dry coating of the elastomeric copolymer material of about 17 ounces per lineal yard, divided approximately equally between the two sides of the fabric.

A cementable fluoroethylenepropylene film was separately prepared using a fused fluoroethylenepropylene sheet 5 mils thick. This film was surface-defluorinated and a thin layer less than one mil thick of the above-described methyl ethyl ketone solution was applied to the defluorinated surface of the film and dried short of curing with heated air.

The coated fluoroethylenepropylene film was applied to the coated polytetrafluoroethylene fabric with the respective coatings pressed into intimate contact. The resulting laminate was drum cured at 400° F. for approximately sixteen hours to achieve complete copolymerization of the elastomeric coating materal and reaction between the elastomeric material and the defluorinated surface of the fluoroethylenepropylene film.

EXAMPLE II

A coated fabric was made from the materials and using the procedures of Example I with the exception that a calendered sheet of the mill mixed materials (without solvent) was applied to the coated polytetrafluoroethylene fabric before the fluoroethylenepropylene film was pressed into place. This calendered top coat had a thickness of about 6 mils, and the coated fluoroethylenepropylene film was pressed into contact with the calendered top coat prior to curing the laminate.

The coated fabrics of both Examples I and II were tested for strength and chemical resistance. Peel strengths were determined at the fabric-coating interface, i.e., the juncture corresponding to the interface between layer 10 and the upper layer 12 in FIG. 1 and that between layer 20 and upper layer 22 in FIG. 2, by first forming a delaminating cut or slice at this juncture and then continuing in accordance with conventional methods for determining peel strengths. Values ranged between 6 and 7 pounds per inch-width for the fabrics of both Examples I and II.

Thirty samples of fabric were exposed in a gaseous environment of 100% fluorine at one atmosphere pressure for two hours. These latter samples showed no visible signs of attack but did exhibit a loss of tensile strength of about 10%. Other samples of the coated fabric of Examples I and II were exposed to liquid fluorine sprayed against the samples under a pressure of 50 p.s.i., the liquid fluorine being impinged on the samples in 5-8 second bursts using a nozzle spaced a distance of about one inch away, until approximately 500 cc. of liquid had been expelled. No fire was observed during the exposures, and the samples showed no visible damage.

A protective suit was fabricated from the material of Example II, and this suit was found to be compatible to the requirements of field operation. A leak check on this suit showed a leakage rate of less than 200 cc. per minute at a pressure differential of approximately 1-2 inches of water, this leakage determination being made using positive air pressure inside the suit.

While particular embodiments of the invention have been shown and described, it is to be understood, of course, that the invention is not limited thereto since many modifications may be made. It is therefore contemplated to cover by the present application all such modifications which fall within the true spirit and scope of the appended claims.

The invention is claimed as follows:

1. A flexible, impermeable coated fabric comprising a fabric consisting of polytetrafluoroethylene fibers, said fabric being coated on at least one side with a cured elastomeric copolymer of about 30% to about 70% by weight vinylidene fluoride and about 70% to about 30% by weight hexafluoropropene, and a film of surface-defluorinated cementable fluoroethylenepropylene adhesively bonded to the coated side of said fabric to form a working face of the resultant sheet.

2. A coated fabric according to claim 1 wherein said elastomeric coating comprises a solution coat.

3. A coated fabric according to claim 1 wherein said elastomeric coating comprises a solution base coat and a calendered top coat.

4. A coated fabric according to claim 1 wherein said fluoroethylenepropylene film is adhesively bonded to said coated fabric with a quantity of said elastomeric copolymer.

5. A coated fabric according to claim 1 wherein said polytetrafluoroethylene fabric is woven.

6. A coated fabric according to claim 1 wherein said elastomeric coating is built-up of successively applied layers cured together.

7. A coated fabric according to claim 1 wherein said polytetrafluoroethylene fabric has a weight of from about 8 to about 15 ounces per square yard, wherein said cured polymer forms a coating having a weight of from about 8.5 to about 21 ounces per square yard of said polytetrafluoroethylene fabric and wherein said fluoroethylenepropylene film has a thickness of from about 2 to about 10 mils.

8. A protective garment made of the laminated fabric assembly of claim 1 wherein the fluoroethylenepropylene film forms the exterior surface of the garment.

References Cited
UNITED STATES PATENTS

| | | | |
|---|---|---|---|
| 2,177,543 | 10/1939 | Vecchi | 2—46 |
| 2,773,781 | 12/1956 | Rodman | 161—189X |
| 2,774,704 | 12/1956 | Smith | 161—189 |
| 2,833,686 | 5/1958 | Sandt | 156—309 |
| 2,871,144 | 1/1959 | Doban | 161—189X |
| 2,941,912 | 6/1960 | Cox et al. | 161—189X |
| 3,025,183 | 3/1962 | Yuan | 117—138.8X |
| 3,025,185 | 3/1962 | Schmidt | 117—138.8 |
| 3,284,806 | 11/1966 | Prasser | 2—2.5X |

HAROLD ANSHER, Primary Examiner

R. A. KILLWORTH, Assistant Examiner

U.S. Cl. X.R.

2—2, 46